March 2, 1965  W. R. JOHNSON  3,171,641
RING SPRING
Filed May 6, 1963
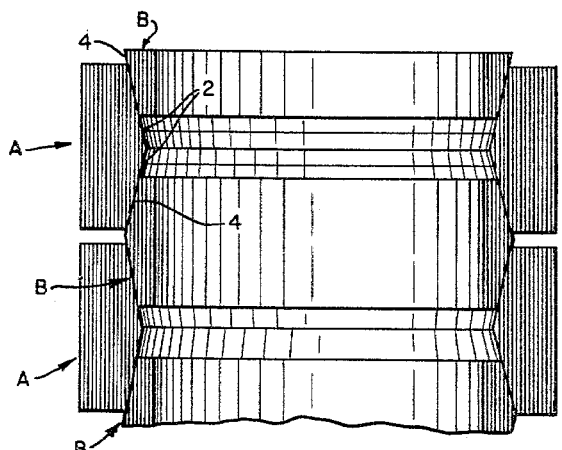
Fig.1
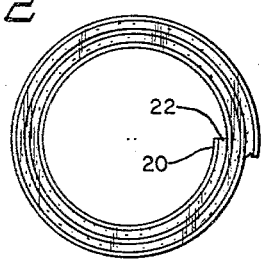
Fig.2
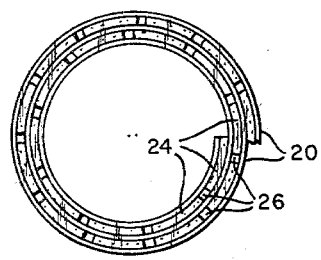
Fig.3
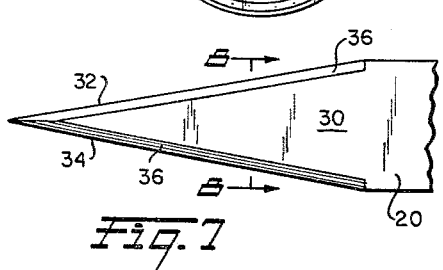
Fig.7  Fig.8
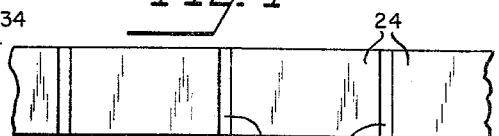
Fig.4
Fig.5
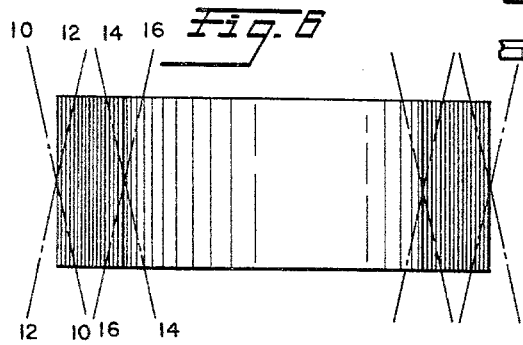
Fig.6
INVENTOR
WILLIAM R. JOHNSON
BY *Scrivener & Parker*
ATTORNEYS

United States Patent Office 3,171,641
Patented Mar. 2, 1965

3,171,641
RING SPRING
William R. Johnson, Bristol, Conn., assignor to Associated Spring Corporation, Bristol, Conn., a corporation of Delaware
Filed May 6, 1963, Ser. No. 278,218
7 Claims. (Cl. 267—9)

This invention relates broadly to springs and spring devices and, more particularly, to that form of compression spring known as a ring spring.

A ring spring consists of a generally cylindrical assembly of alternate inner and outer rings, the outer surfaces of the inner rings and the inner surfaces of the outer rings abutting and being inclined with respect to the longitudinal axis of the assembly, so that when an axial load is applied to the assembly sliding occurs along the abutting, inclined surfaces of the rings, causing the inner rings to be compressed and the outer rings to be expanded, with approximately uniform distribution of circumferential stress in both the inner and outer rings, thus yieldingly and resiliently opposing the applied load. Such springs are very useful where space is limited and a relatively large amount of energy must be absorbed, or a large amount of damping is desired.

Heretofore, ring springs have been made by machining forgings or bars to the desired ring shape and then heat treating to produce a hardness that is low relative to other spring designs. This is required because of the tendency of the rings to break at surface discontinuities if made of brittle material of the considerable hardness of other types of springs. The high cost of making ring springs by this method, and the problem of adequate lubrication of the mating surfaces, have prevented more widespread use of springs of this type.

It is accordingly the principal object of this invention to provide a ring spring formed of rings which are so constructed that they are not only highly resistant to local failure but also have much greater available strength than rings of known, solid construction.

In accordance with the invention each inner and outer ring of a ring spring is formed of connected, abutting, generally cylindrical convolutions. In the preferred embodiment of the invention each ring consists of a spiral coil spring formed of spring metal strip wound into a desired number of abutting convolutions to produce a ring of the desired dimensions and having a circumferential surface which is inclined with respect to the axis of the ring, this being an outer or inner surface depending on the intended use of the ring as an inner or outer ring of a ring spring. Such a tight wound spiral coil spring may be made by any of the many well known methods of making such springs, such as that disclosed in United States Letters Patent No. 1,977,546 to Fornelius.

Description of the drawings

FIG. 1 is a longitudinal sectional view through a ring spring formed in accordance with this invention;

FIG. 2 is a top plan view of one form of ring for a ring spring according to the invention, in which bonding material is interposed between the convolutions of the ring;

FIG. 3 is a top plan view of a modified form of the embodiment of the invention disclosed in FIG. 2;

FIG. 4 is a partial plan view of the spring strip and bonding means of the ring disclosed in FIG. 3;

FIG. 5 is a side view of the parts shown in FIG. 4;

FIG. 6 is an axial sectional view of a ring for a ring spring made in accordance with this invention, illustrating one way in which the ring may be formed;

FIG. 7 is a plan view of the end part of a strip which may be coiled to form a ring for a ring spring in accordance with the invention, and FIG. 8 is a cross sectional view taken on the line 8—8 of FIG. 7.

A ring spring constructed as described and in accordance with this invention, is disclosed in FIG. 1 of the drawings, and comprises a plurality of outer rings A and a plurality of inner rings B, each of which is a tight wound spiral coil spring. Each outer ring A has the oppositely inclined inner surfaces 2 which are in sliding abutting engagement with the oppositely inclined outer surfaces 4 of the adjacent inner rings B. A thin section of spring strip has much less tendency to the formation of surface discontinuities than a machined ring and, in addition, local failure will not propagate across the strip layers as easily at it will across a machined ring. The usable strength of the laminated section of a ring of a ring spring made in accordance with this invention is therefore greater than that of a solid section.

If desired, the adjacent laminations or convolutions of each ring may be bonded together, as by an epoxy resin or a similar material, to control relative axial slipping movement of the laminations or convolutions when the ring spring is put under load. A ring having one construction according to this aspect of the invention is disclosed in FIG. 2 of the drawings, and comprises spring convolutions 20 which are connected by bonding material 22. The bonding material may be a heavy layer of elastomer, which will yield in compression on initial loading of the spring to provide an initial deflection at low spring rate, followed by deflection at a high spring rate as the steel convolutions or laminations go into tension or compression with increase of load on the spring.

A modified form of ring spring in which the convolutions or laminations are bonded together is disclosed in FIGS. 3, 4 and 5. In this embodiment the bonding material is applied in segments 24 which are spaced along the length of the coiled strip 20, leaving spaced gaps or passages 26 extending axially of the ring spring to facilitate the storage and flow of lubricant.

Each ring having the construction provided by the invention may be made in any desired or suitable way to provide the oppositely inclined faces required to permit the rings to be used as elements of a ring spring. One of the preferred methods of making a ring is illustrated in FIG. 6 of the drawings and consists in forming a strip of constant width into a tight wound coil spring and then cutting it to form the oppositely inclined surfaces. Thus, if an inner ring is to be formed the coil of constant width is cut along the lines 10—10 and 12—12 to form oppositely inclined outer surfaces, while the coil is cut along the lines 14—14 and 16—16 to form oppositely inclined inner surfaces on the ring if an outer ring is to be formed. The ring may be cut by grinding, machining or in any other suitable way.

Alternatively, the spring steel strip may be formed, before coiling, to a shape which, when the strip is coiled into a spiral, will produce the oppositely inclined inner or outer surfaces. Thus, as disclosed, in FIGS. 7 and 8, the end part 30 of the spring steep strip 20 may be formed into a pointed shape by equally converging side edges 32, 34 along each of which there extends a beveled surface 36.

It will be apparent that the spring steel strip disclosed in FIGS. 7 and 8 may be used to form either outer or inner rings. In forming an inner ring the coiling will begin with the end of the strip opposite to the pointed end, which will become the outer convolutions of the coil, while in making an outer ring the coiling will begin with the pointed end, which will become the inner convolutions of the coil.

While I have described and illustrated several forms which my invention may take, it will be understood by those skilled in the arts to which it relates that other embodiments, as well as modifications of those disclosed, may be made and practiced without departing in any way from the spirit or scope of the invention, for the limits of which reference must be made to the appended claims.

What is claimed is:

1. A ring spring device of the type characterized by at least one pair of co-operating annular inner and outer rings wherein the inner surface of the outer ring is formed with a taper surface mating with and contacting a corresponding taper surface on the outer surface of the adjacent inner ring, each of said rings comprising a spiral coil formed from an elongated strip of spring strip metal shaped from end to end to provide the cross sectional shape of the ring, said metal rings being adapted to engage one another along said mating taper surfaces whenever an axial load is applied to the spring device which tends to drive one ring into another in telescoping fashion.

2. A spring according to claim 1, in which adjacent convolutions of each spiral ring are in tight abutting engagement.

3. A spring according to claim 1, in which adjacent convolutions of each ring are spaced apart to form an open spiral, and comprising in addition bonding material between adjacent convolutions.

4. A ring spring device of the type characterized by at least one pair of co-operating circularly continuous inner and outer rings wherein the inner surface of the outer ring is formed with a taper surface mating with and contacting a corresponding taper surface on the outer surface of the adjacent inner ring, each of said rings comprising a spiral coil formed from an elongated strip of spring strip metal shaped from end to end to provide the cross sectional shape of the ring, said rings being adapted to engage one another along said mating taper surfaces whenever an axial load is applied which tends to drive one ring into another in telescoping fashion, the adjacent convolutions of each ring being spaced to form a open spiral, and bonding material between adjacent convolutions, the bonding material being in segments spaced along the length of the spiral strip leaving passages between adjacent segments which extend axially of the spring.

5. As a new article of manufacture, a ring formed of a circular continuous spiral coil of spring strip metal having spaced convolutions, said ring having one cylindrical surface and one axially tapered circumferential surface, and bonding material between adjacent convolutions, said material being in segments spaced along the length of the spiral strip leaving passages between adjacent segments which extend axially of the ring.

6. As a new article of manufacture, a ring spring element comprising an annular spiral coil of spring strip metal having a cylindrical exterior surface and two inner surfaces which are oppositely inclined with respect to the axis of the ring.

7. As a new article of manufacture, a ring spring element comprising an annular spiral coil of spring strip metal having a cylindrical inner surface and two outer surfaces which are oppositely inclined with respect to the axis of the ring.

References Cited by the Examiner
UNITED STATES PATENTS

| | | | |
|---|---|---|---|
| 2,920,494 | 1/60 | Dodwell | 74—231 X |
| 3,071,422 | 1/63 | Hinks | 267—57.1 X |
| 3,073,585 | 1/63 | Hanle | 267—9 |

ARTHUR L. LA POINT, *Primary Examiner.*

PHILIP ARNOLD, *Examiner.*